May 29, 1923.  1,456,834
J. H. SHEFFIELD
ART OF PRINTING
Filed April 10, 1916

*Fig. 1*

The body that the boys had discovered was dragged ashore and she said that she identified the remains which she could still recognize by the clothes although they had lain long in the water and were much decomposed.

*Fig. 2*

The BODY *THAT* the BOYS HAD DISCOVERED WAS DRAGGED ashore AND SHE SAID *that she identified* the remains *which* SHE COULD still RECOGNIZE by the clothes *although* THEY HAD LAIN long in the water AND WERE much DECOMPOSED.

*Inventor:*
Joseph H. Sheffield,
By Joshua Jowle Clapp & Soans
attys.

Patented May 29, 1923.

1,456,834

UNITED STATES PATENT OFFICE.

JOSEPH HENRY SHEFFIELD, OF CHICAGO, ILLINOIS.

ART OF PRINTING.

Application filed April 10, 1916. Serial No. 90,240.

*To all whom it may concern:*

Be it known that I, JOSEPH H. SHEFFIELD, a citizen of the United States, residing at Chicago, in the county of Cook and State of Illinois, have invented certain new and useful Improvements in the Art of Printing, of which I do declare the following to be a full, clear, and exact description, reference being had to the accompanying drawing, forming a part of this specification.

In the drawing under the designation Figure 1, I have shown a sentence printed in the ordinary way; and under the designation Figure 2, I have shown the same sentence printed in accordance with my invention.

A sentence, whether it be simple, compound or complex, is composed of syntactic elements, each of which elements comprises either a single word or a group of words. In order that one may grasp the correct structure and true meaning of a sentence, it is necessary not only that he should know the meaning of each individual word and which one of the eight recognized parts of speech it is, but also that he should understand the exact relations which the words were intended by the writer of the sentence to bear to each other in that particular sentence. That is to say, it is not enough to know that a word is a verb, a noun, etc., and what its meaning is, but it must also be known whether, as used in a given sentence, a verb is independent or dependent, whether a noun is subject or object, whether a group of words constituting one of the syntactic elements of the sentence is of main or subordinate character, and what precise relation the several syntactic elements of the sentence (whether individual words or groups of words) bear to each other.

My invention has for its object to show visually the structure of sentences and the exact relation of their syntactic elements to each other so as to enable the intended meaning of sentences to be readily ascertained. This object is accomplished by printing sentences in such manner as to visually show not only the syntactic elements of the sentence structure, but also to show their exact syntactic relations to each other.

In the teaching of grammar, it has heretofore been proposed (as in McNeil Patent No. 218,306, dated August 5, 1879), to provide means whereby the recognized parts of speech, eight in number, may be set up from types or blocks having differently colored letters thereon so that in a sentence thus formed each different part of speech will be distinguishable by its color.

By thus forming sentences with the parts of speech in different colors, the several parts of speech can be readily differentiated. Such use of colors cannot of itself, however, enable the reader to grasp the intended meaning of a sentence, since the meaning of a sentence, particularly if it be compound or complex (i. e. a sentence with two or more verbs and with dependent clauses), must depend upon an understanding not only of the identity of the different parts of speech, (i. e. whether verbs, nouns, adverbs, etc.), but also of the main and subordinate syntactic elements of the sentence and of the relations of these elements one to another.

Thus, a sentence in which each of the eight parts of speech is displayed in its own color, may have a number of verbs—some dependent and others independent—, may have a number of nouns,—some subjects of verbs and others objects of verbs—, and may have noun clauses, adjective clauses and adverb clauses, each involving several parts of speech, with the result that such a sentence made up of differently colored words, while indicating the eight parts of speech, would offer no suggestion as to the proper syntactic relations of the elements and no aid in making clear or free from ambiguity the true meaning of the sentence. This is due to the fact that in a sentence comprising, for example, a plurality of verbs, nouns, etc., and in which all verbs, all nouns, etc., are indicated by like colors, there is nothing to visually distinguish independent verbs from dependent verbs, subject nouns from object nouns, etc., or to indicate the relations between the main and the subordinate syntactic elements of the sentence.

My invention contemplates so printing the sentence that the different kinds of type employed will enable the reader to distinguish at a glance not only the different syntactic elements of a sentence and thus know at once whether a verb is dependent or independent, whether a noun is a subject or an object, whether a group of words is a noun clause, and the like, but also will show at a glance the relations existing between the various elements in the sentence structure.

In the preferred manner of carrying out my invention, I use different kinds of type for distinguishing one from another the following syntactic elements of sentences, viz.—

(1) Independent verbs and subjects of independent verbs and conjunctions connecting independent verbs;

(2) Dependent verbs and subjects of dependent verbs and coordinate conjunctions connecting dependent verbs;

(3) Objects of verbs;

(4) Noun clauses;

(5) Subordinate conjunctions and relative pronouns introducing respectively adverb and adjective clauses in the first degree of subordination; and (6) Subordinate conjunctions and relative pronouns introducing respectively adverb and adjective clauses in the second degree of subordination.

The result of thus using different kinds of type for the different syntactic elements of sentences enables these elements of sentences to be visually distinguished at a glance, so that the reader can understand at once the structure of the sentences, and is thus enabled to understand the intended meaning of the sentences so printed. Preferably, the different syntactic elements of sentences will be printed in the following different kinds of type, since these kinds of type by reason of their recognized relative prominence will also aid not only in indicating the different syntactic elements of the sentence but also in showing their relative syntactic importance:—

Independent verbs with their subjects and the conjunctions connecting the independent verbs will be printed in roman capitals;

Dependent verbs with their subjects and the coordinate conjunctions connecting the dependent verbs will be printed in roman small capitals;

Objects of verbs will be printed in roman bold face;

Noun clauses will be printed in bold face italics;

Subordinate conjunctions and relative pronouns introducing respectively adverb and adjective clauses in the first degree of subordination will be printed in capital italics;

Subordinate conjunctions and relative pronouns introducing respectively adverb and adjective clauses in the second degree of subordination will be printed in light face italics;

Other words will be printed in the usual body type employed for the text.

In the accompanying drawing, I have shown in Fig. 1 a sentence as it will appear when printed in the usual manner in ordinary upper and lower case roman characters. In Fig. 2, I have shown the same sentence printed in keeping with my invention.

By reference to the sentence as printed in Fig. 1 of the drawing, it will be seen that the ordinary manner of printing gives the reader no assistance in determining the syntactic elements and the relations which they bear to each other. It does not tell him which verbs are independent and which are dependent. It does not tell him which nouns are subjects and which nouns are objects. It does not show the intended relation of the different clauses to each other and to the main verb. In this sentence in Fig. 1 this uncertainty in regard to the syntactic relations gives rise to ambiguity in meaning, to wit:—

(1) To what does the conjunction "although" connect the verbs "had lain" and "were decomposed"?

(2) To what does the pronoun "they" refer? As printed in Fig. 2, the different types used convey to the reader at a glance the following information:

(1) "was dragged" and "said" are the independent verbs, connected by the conjunction "and", having for subjects, respectively, "body" and "she". This is shown by the roman capitals.

(2) "had discovered", "could recognize", "had lain", "were decomposed" are all shown by the small capitals to be dependent verbs with respective subjects "boys", "she" and "they"; "and" is shown by the small capitals to connect the dependent verbs "had lain" and "were decomposed".

(3) "remains" is shown by the roman bold face italics to be the object of "identified".

(4) "that she identified" is shown by the bold face italics to be a noun clause.

(5) "that" (after "body") is shown by the capital italics to introduce a clause in the first degree of subordination. i. e., dependent upon the main verb "was dragged".

(6) "which" and "although" are shown by the light face italics to introduce clauses in the second degree of subordination, i. e., not dependent directly upon the main verbs.

It will be noticed that the selection of types in Fig. 2 removes the ambiguity referred to above, for the types show that the two verbs introduced by "although", viz., "had lain" and "were decomposed", are not joined directly to either of the independent verbs "was dragged" and "said", but to the dependent verb "identified" and hence that the pronoun "they" must refer to "remains" which is the object of the verb "identified."

By printing sentences in keeping with my invention, not only is the reader enabled to grasp the intended meaning without ambiguity, but also the teaching and learning of languages is greatly facilitated, because the reader is assisted in construing the sentence by having the syntactic structure visually indicated. The different kinds of type have a plain, predetermined and distinctive meaning and they cooperate in producing a visible picture of sentence structure not only indicating and differentiating the syntactic elements of sentences, but also showing at a glance the relative syntactic importance of these elements.

Having thus described my invention, what I claim as new and desire to secure by Letters Patent, is:—

1. The improved method of visually indicating the structure and meaning of a sentence that consists in printing in type of different kinds words and groups of words that comprise syntactic elements of the sentence, the different kinds of type serving to show the relationship that the elements, as component parts of the sentence, bear to one another.

2. A sheet having printed thereon a sentence comprising a plurality of syntactic elements composed of single words and groups of words, said elements being printed in types of different character whereby said elements and their relations to one another are visually indicated.

3. A sheet having printed thereon a sentence composed of a plurality of main and subordinate syntactic elements, said main elements being printed in more prominent type than any of the said subordinate elements.

JOSEPH HENRY SHEFFIELD.